United States Patent [19]

Reynolds

[11] 3,719,154

[45] March 6, 1973

[54] RESILIENT SIDE BEARING ASSEMBLY

[75] Inventor: David J. Reynolds, Upper Arlington, Ohio

[73] Assignee: Buckeye Steel Castings Company, Columbus, Ohio

[22] Filed: April 13, 1971

[21] Appl. No.: 133,535

[52] U.S. Cl. .................105/199 CB, 267/3, 308/138
[51] Int. Cl. ..........B61f 5/14, B61f 5/24, F16c 17/04
[58] Field of Search.....105/197 R, 199 CB; 267/3, 4; 308/137, 138

[56] References Cited

UNITED STATES PATENTS

| | | |
|---|---|---|
| 3,518,948 | 7/1970 | King et al. .........................308/138 X |
| 3,556,503 | 1/1971 | Van Moss, Jr............................267/3 |
| 2,777,401 | 1/1957 | Russell..............................105/197 R |
| 139,862 | 6/1873 | Bridges....................................267/3 |
| 2,301,372 | 11/1942 | Cottrell ................................308/138 |
| 2,913,288 | 11/1959 | Blattner...............................308/138 |

Primary Examiner—Robert G. Sheridan
Assistant Examiner—Howard Beltran
Attorney—Clelle W. Upchurch

[57] ABSTRACT

Side bearings for a railway freight car having an elastomeric body disposed between the body bolster and the truck bolster. The assembly includes a rigid metal channel member which limits the displacement or distortion of the elastomeric material under compression and thereby limits the swinging movement of the car body relative to the truck bolster.

10 Claims, 7 Drawing Figures

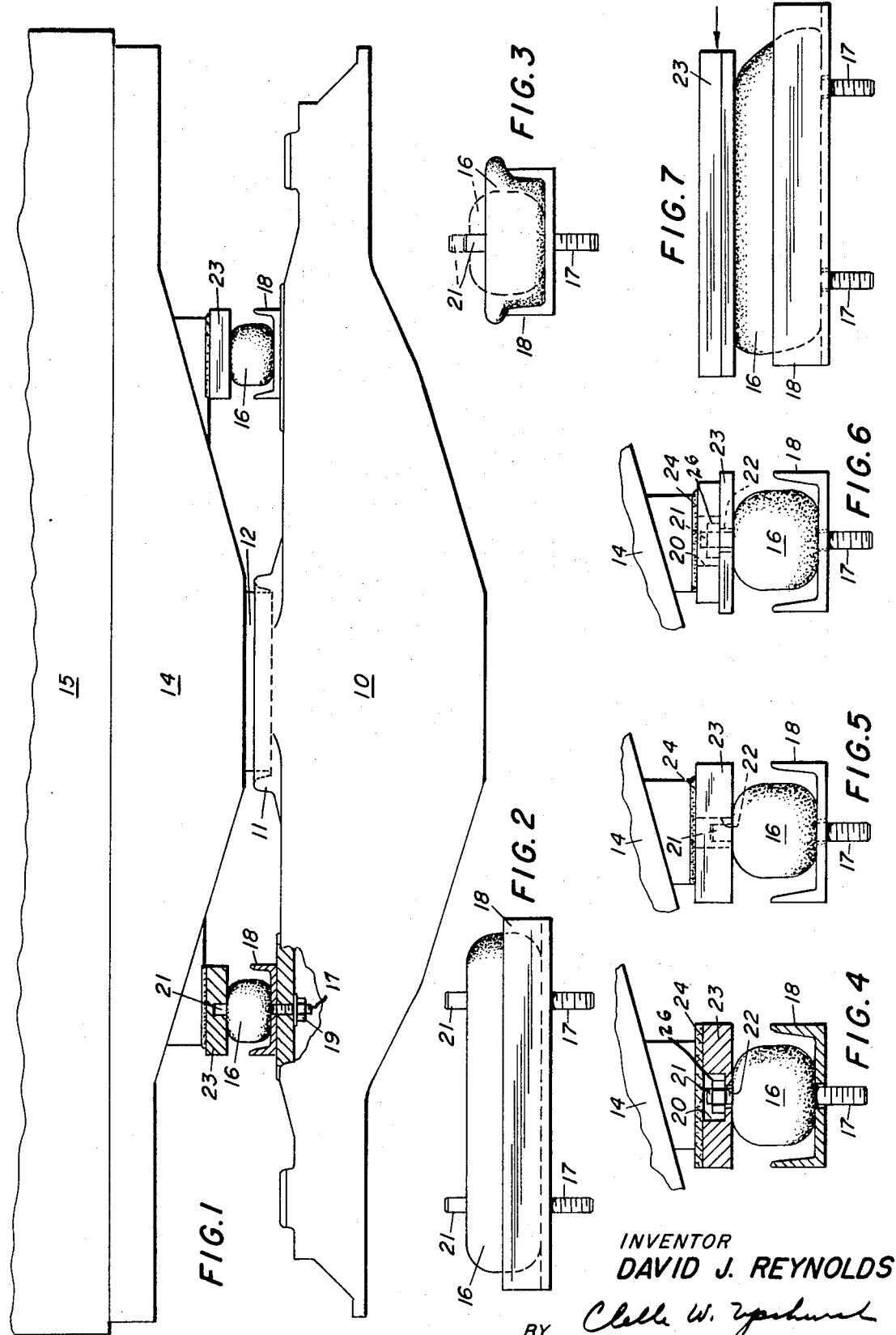

RESILIENT SIDE BEARING ASSEMBLY

The present invention relates to constant contact side bearing assemblies for railway cars wherein elastomeric material forms a part of each side bearing and wherein metal-to-metal contact of the side bearings is eliminated.

An object of the invention is to provide side bearings of a railway vehicle having an elastomeric body which is distorted to some extent by the weight of the car body at all times and discourages rocking of the car body relative to the truck bolster.

Another object of the invention is to provide side bearing assemblies for railway cars wherein elastomeric material is at all times under compressive forces with the result that the side bearings exert upward force on the car body and thereby relieve the center plate of some of the load imposed on the truck bolster by the car body.

Another object of the invention is to provide a side bearing assembly which allows the truck bolster to swivel and to turn about the axis of the king pin with the development of shear stresses in an elastomeric body of the bearing which tend to urge the truck to a center position transversely of the car body after negotiation of a curve in the track.

Other objects and features of the invention will be appreciated and become apparent as the present disclosure proceeds and upon consideration of the accompanying drawing taken with the following detail description wherein an embodiment of the invention is disclosed.

FIG. 1 is an elevational view of a conventional truck bolster and body bolster for a railway car and with an embodiment of the side bearing assemblies provided by the invention mounted therebetween;

FIG. 2 is a side elevational view of one of the side bearing assemblies;

FIG. 3 is an end elevational view of one of the side bearing assemblies showing the manner in which displacement or distortion of the elastomeric material occurs;

FIG. 4 is a cross-section of a side-bearing assembly illustrating a means for attaching the bearing to the body bolster;

FIG. 5 is an end view of a side-bearing assembly illustrating another means for attaching the bearing to the body bolster;

FIG. 6 illustrates still another means for attaching a side bearing assembly to the body bolster; and FIG. 7 is a view similar to FIG. 2 showing the manner in which the elastomeric material is displaced in shear during swiveling of the truck bolster relative to the body bolster.

Referring now to FIG. 1, a truck bolster 10 is equipped with the conventional type of center bowl 11 for receiving the downwardly projecting portion 12 of the center plate carried by a body bolster 14. In accordance with the custom in the past side bearings are displaced from the axis of the center bowl by approximately 25 inches or more to limit the downward swinging of one side of the body bolster relative to the truck bolster.

The present invention pertains to side bearing assemblies for mounting between the truck bolster 10 and the body bolster 14 so as to limit the swinging movement of the body bolster 14 relative to the truck bolster 10. In the embodiment shown in the drawings an elongated body 16 of elastomeric material is arranged transversely of the truck bolster 10. One or more threaded studs 17 may be suitably anchored in the elastomeric body 16 such as by rigidly securing them to a transversely extending metal plate embedded in body 16 so as to project downwardly therefrom and through openings in a channel member 18 of U-shaped cross section. The studs 17 may, if desired, extend through openings in the truck bolster 10 and nuts 19 may be applied to secure the assembly to the truck bolster 10. The elastomeric material may be natural or synthetic rubber, polyurethane or other suitable elastomer.

A plurality of threaded studs 21 suitably anchored in the elastomeric body 16 project above the upper surface thereof and may be connected in a suitable opening provided in a rigid type bearing member 23 carried by the body bolster 10. The nuts 26 may be applied over the studs 21. Studs 16 may be rigidly secured to the same metal plate as studs 17 or may be rigidly secured to a second transversely extending metal plate spaced above the first metal plate and embedded in body 16.

In mounting the side bearing assemblies in a railway car the height or thickness of elastomeric body 16 is selected to insure that it is subjected to a compressive force by the weight of the car and is distorted slightly even when the transverse axis of the body bolster 14 is substantially horizontal. It has been found that a total stroke up and down as the car sways should not be substantially greater than about one inch. Thus the height of body 16 is preferably reduced about one-half inch by distortion under the weight of the car while body bolster 14 is substantially horizontal. This leaves some of the car weight supported on the center bowl even when the railway car body is not loaded. Furthermore, as the car body rocks away from one of the bearings it will return to its natural shape and rise with the member 23. Such an arrangement insures that upon the return rock of the car body the bearing will remain in contact with body bolster 14 and air gap and violent impact will be avoided.

In the event that the downward force on the elastomeric body 16 exceeds that which reduces its height by one-half inch, the elastomeric material will be distorted in a manner similar to that shown in FIG. 3 until the elastomeric material fills the channel member 18. Further downward movement will then be limited to that resulting from bulging of the elastomeric material over the edges of channel member 18 because the elastomeric material is non-compressible and additional distortion is prevented by channel member 18. Bulging above the edges of channel member 18 only occurs under very high forces. There being no further room for distortion of elastomeric body 16, it becomes almost solid and prevents metal-to-metal contact.

Relative motion between the top and bottom bearings of the side bearing assemblies allows the truck to swivel and turn about the axis of the king pin. As illustrated in FIG. 7, the elastomeric body 16 distorts in shear as the truck swivels. The energy stored in the distorted elastomeric body 16 as a result of the shear stresses tends to urge the truck bolster 10 to return to a position substantially at right angles to the axis of the car body.

As illustrated in FIG. 4, stud 21 may extend through a bore 22 and be secured to metal block 23 by nut 26 resting on the shoulder formed by counterbore 20. Bearing member 24 is rigidly secured to the body bolster 14. The truck can swivel by sliding of the car body on block 23 and through shear in the elastomeric material.

The embodiment of FIG. 6 is similar to that of FIG. 4 to the extent that nut 26 secures block 23 to elastomeric body 16. However, block 23 is rigidly secured to member 24 to prevent relative movement therebetween. This prevents the truck from separating from the car body in the event of derailment while providing for swivel through shear of elastomeric body 16 as illustrated in FIG. 7.

No nut is used on stud 21 in the embodiment of FIG. 5. Stud 21 is held by bore 22 of block 23 which is rigidly secured to member 24 of body bolster 14. Swivelling of the truck is permitted by shear of the elastomeric body 16.

The physical properties and volume of the elastomeric body are selected in order that distortion under the load applied thereon will be sufficient for the retaining means to limit the total stroke up and down to about one inch. Ideally, the cross-section of the distorted elastomeric body under maximum compression is substantially equal to the internal cross-section of the retaining means although it can be somewhat greater than that. Preferably, the elastomeric body may extend laterally in shear as much as its uncompressed height or depth but usually it will extend in shear an amount equal to not more than about one-half of its depth. The elastomeric body contemplated by the invention is substantially non-porous and is compressible in the sense that it distorts but is not reduced in volume under an applied load.

While the invention has been described with reference to particular structural features and with reference to one type of side bearing assembly it will be appreciated that changes may be made in the elements as well as the overall organizations. Such modifications and others may be made without departing from the spirit and the scope of the invention as set forth in the appended claims. For example, any type of center bowl may be substituted for the conventional one shown in the drawing. Likewise, retaining means 18 may have any convenient shape and, if desired, may be secured to body bolster 14 instead of truck bolster 10.

What is claimed is:

1. A railway vehicle comprising a car body supported on a body bolster having a center plate, a truck bolster having a center bowl, a king pin pivotably connecting the two bolsters together with the center plate disposed in the center bowl, and laterally spaced on each side from said center bowl a side bearing secured to the truck bolster, said side bearing comprising a distortable elastomeric pad distorted under the compressive forces of the weight imposed by the body bolster on the truck bolster when the bolsters are horizontal and the vehicle is empty, said pad being disposed within the cavity of a rigid open ended channel member which is U-shaped in cross-section, is secured to the truck bolster and has its upstanding walls spaced from the elastomeric pad when the bolsters are horizontal and engages said pad and limits its distortion as the body bolster swivels from horizontal and further distorts said pad, the height of said pad being greater than that of said upstanding walls and the distortion of the pad when the bolsters are horizontal being sufficient whereby said side bearing exerts an upward force on the body bolster as it sways upwardly from the truck bolster with rocking of the car from side to side.

2. The vehicle of claim 1 wherein the cross-section of the pad under maximum compression is substantially equal to the internal cross-section of the channel member.

3. The side bearing of claim 1 wherein the channel member is arranged transversely on the truck bolster and provides space at its ends which allows said body to distort in shear with swivelling movement of the truck.

4. The side bearing of claim 3 wherein at least one stud has one end anchored in the elastomeric body and is rigidly secured at the other end to the truck bolster.

5. The side bearing of claim 4 wherein at least one stud has one end anchored in the elastomeric body and is rigidly secured at the other end to a metal block lying adjacent the underside of the body bolster.

6. The side bearing of claim 5 wherein the said metal block is rigidly secured to the body bolster.

7. The side bearing of claim 5 wherein the said metal block is in slidable contact with a bearing surface of the body bolster.

8. The side bearing of claim 1 wherein the elastomeric body projects above the walls of the channel member after further distortion is prevented by the walls and the projecting portion distorts across the upper edges of the walls as additional load is applied on the body.

9. The side bearing of claim 1 wherein the elastomeric body is compressed about one-half inch by the weight thereon when the transverse axis of the body bolster is substantially horizontal and the total stroke as the car body sways is about one inch.

10. The side bearing of claim 1 wherein the elastomeric body is a substantially non-porous rubber.

* * * * *